(12) United States Patent
Rolland et al.

(10) Patent No.: US 8,817,270 B2
(45) Date of Patent: Aug. 26, 2014

(54) OPTICAL TESTING APPARATUS AND METHODS

(75) Inventors: Jannick P. Rolland, Pittsford, NY (US); Kyle Fuerschbach, Rochester, NY (US)

(73) Assignee: University of Rochester, Rochester, NY (US)

( * ) Notice: Subject to any disclaimer, the term of this patent is extended or adjusted under 35 U.S.C. 154(b) by 333 days.

(21) Appl. No.: 13/429,793

(22) Filed: Mar. 26, 2012

(65) Prior Publication Data

US 2012/0243001 A1 Sep. 27, 2012

Related U.S. Application Data

(60) Provisional application No. 61/467,075, filed on Mar. 24, 2011, provisional application No. 61/546,230, filed on Oct. 12, 2011.

(51) Int. Cl.
*G01B 9/02* (2006.01)
*G01M 11/02* (2006.01)

(52) U.S. Cl.
CPC ................................ *G01M 11/025* (2013.01)
USPC .......................................................... 356/512

(58) Field of Classification Search
CPC .......................... G01M 11/005; G01M 11/025
USPC ................... 356/510–515, 457, 458
See application file for complete search history.

(56) References Cited

U.S. PATENT DOCUMENTS

| 6,313,951 | B1 | 11/2001 | Manhart et al. |
| 6,999,182 | B2 * | 2/2006 | Thibault ....................... 356/513 |
| 7,336,370 | B1 * | 2/2008 | Olczak et al. ................. 356/512 |
| 2006/0268282 | A1 | 11/2006 | Evans et al. |

OTHER PUBLICATIONS

Paper of David Shafer "Null lens design techniques" May 1, 1992.*
Nakano et al.; Configuration of an off-axis three-mirror system focused on compactness and brightness; Applied Optics, vol. 44, No. 5, Feb. 10, 2005; 776-783.
Rogers, John R.; A Comparison of Anamorphic, Keystone, and Zernike Surface Types for Aberration Correction, SPIE-OSA, vol. 7652, 76520B-1-765220B-8.

* cited by examiner

*Primary Examiner* — Gregory J Toatley, Jr.
*Assistant Examiner* — Maurice Smith
(74) *Attorney, Agent, or Firm* — William Greener; Bond, Schoeneck & King, PLLC

(57) ABSTRACT

An apparatus and associated method for testing a non-symmetric (e.g., phi-polynomial) surface. The apparatus uses several simple (singlet) optical elements (e.g., an Offner null configuration) and a tilted optic under test in combination with an active optical element (e.g., actuated, deformable membrane mirror, optical phase modulator, etc.) that together form a null or quasi-null that allows for conventional null-based interferometry. This solution solves the problem of exceeding the dynamic range of a conventional interferometer when trying to test non-symmetric optical surfaces.

26 Claims, 5 Drawing Sheets

(a)

(b)

OPTICAL TESTING APPARATUS AND METHODS

RELATED APPLICATION DATA

The instant application claims priority to U.S. Provisional application Ser. No. 61/546,230 filed on Oct. 12, 2011 and U.S. Provisional application Ser. No. 61/467,075 filed on Mar. 24, 2011, the subject matters of which are incorporated herein by reference in their entireties.

GOVERNMENT FUNDING

This invention was made with support from the National Science Foundation under Agreement No. EECS-1002179. The government has certain rights in the invention.

BACKGROUND

1. Field of the Invention

Embodiments of the invention are generally directed to the field of optical systems; more particularly, to an optical surface metrology apparatus and associated method; and, most particularly an optical surface metrology apparatus and associated method for use with a phi ($\phi$)-polynomial surface.

2. Related Art Discussion

Interferometric measuring apparatuses are commonplace in the optical fabrication industry and provide the fabricator with a surface deviation map that can be used to further direct polishing that ensures the surface meets a quality standard required by the optical design. A conventional interferometric apparatus for testing a spherical or planar optical surface includes a coherent light source and set of reference (null) optics that perform two functions: (1) the reference optics create a wavefront that matches the curvature of the surface under test such that the wavefront is retro-reflected back towards the reference optics and, (2) the reference optics create a reference wavefront that will interfere with the wavefront reflected from the surface under test. The interferogram that is generated by the interference of the two wavefronts contains information pertaining to the deviation of the surface under test from the ideal (reference) wavefront. In the case of aspheric and non-rotationally symmetric surfaces, such as, phi-($\phi$) polynomial surfaces, the reference optics and/or method of measuring the optical surface must be modified to accommodate this new surface type. One type of reference optic that may be employed is a computer generated hologram (CGH), which is a diffractive optical element that encodes an aspheric wavefront into the optical surface such that the light continues to strike the surface under test orthogonally. A CGH reference is accurate within a reasonable range of magnification, but the pricing is prohibitive in many cases, especially if the optical system contains three or more optical surfaces where a separate CGH null is required for each optical surface. Methods that are dynamic, not requiring a separate null for each optic surface, have been introduced in the case of aspheric and off-axis portions of a conic. For these methods the adaptive element is either an actuated, deformable membrane mirror or thin mirror substrate with a bending harness. In each case, the adaptive null is rotationally symmetric and does not provide the degrees of freedom to adequately measure a non-rotationally symmetric optical surface like a phi-polynomial surface.

The inventors recognize that affordable and efficacious solutions to the problems and challenges of testing a nonsymmetric optical surface (such as a phi-polynomial surface, for example), in which the dynamic range of a conventional interferometer apparatus is exceeded would be advantageous and beneficial.

SUMMARY

An embodiment of the invention is an optical surface metrology apparatus. The apparatus a light source adapted to output a plane wavefront in a first propagation direction; a plurality optical components disposed in an Offner configuration, optically coupled to the light source; an optical component under test disposed in a first tilted orientation and optically coupled to the plurality optical components, wherein the optical component under test is characterized by a phi ($\phi$)-polynomial surface; and an optical phase controller optically coupled to the optical relay component. Various exemplary, non-limiting aspects of the embodied invention may include the following additional features and characteristics:

wherein the plurality of optical components disposed in an Offner configuration is an Offner null lens consisting of a spherical aberration component and a relay component;

wherein the optical component under test has one of a concave and a convex surface;

wherein the optical component under test is one of a concave surface and a convex surface of a mirror or a lens;
further comprising an optical component disposed in a second tilted orientation, wherein the optical component is characterized by a capability to converge a diverging wavefront propagating from the optical component under test;

wherein the optical phase controller is a deformable mirror;

wherein the optical phase controller is a dynamically addressable wavefront generator;

wherein the optical phase controller is a dynamically addressable asymmetric wavefront generator;

further comprising an interferometer capable of performing conventional null-based or quasi-null-based interferometry, disposed on an output side of the Offner configuration and optically coupled to an output of the optical phase controller;

wherein the output of the optical phase controller is an asymmetric reference wavefront.

wherein the interferometer is a Fizeau-type interferometer;

wherein the interferometer is a Twyman Green interferometer;

wherein the optical component under test is disposed in a first tilted orientation sufficient to null astigmatism;

wherein the optical phase controller is adapted to at least partially null at least one of coma and any higher-order $\phi$-polynomial terms.

An embodiment of the invention is a method for optical surface metrology of a $\phi$-polynomial surface. The method includes the steps of a) providing an optical component to be tested, wherein the optical component to be tested has a $\phi$-polynomial surface and is characterized by an amount of at least one of spherical aberration, coma, astigmatism, and higher-order aberrations; b) propagating a plane wavefront towards the $\phi$-polynomial surface of the optical component to be tested; c) providing an optical component that induces spherical aberration to the plane wavefront in an amount sufficient to at least partially null the spherical aberration in the optical component to be tested. d) tilting the optical component to be tested to null the astigmatism therein, and generating a wavefront having at least one of coma and a higher-order aberration; e) at least partially correcting the wavefront for the at least one of the coma and the higher-order aberration; f) propagating the at least partially-corrected wavefront back to the optical component to be tested and to the optical component that induced the spherical aberration to the plane wavefront, referred to as the test wavefront. Various exemplary, non-limiting aspects of the embodied invention may include the following additional features and characteristics:

further comprising comparing the test wavefront to a reference wavefront;

further comprising providing a Fizeau-type interferometer to compare the test wavefront to the reference wavefront;

further comprising providing a Twyman-Green interferometer to compare the test wavefront to the reference wavefront;

wherein the optical component to be tested has one of a concave and a convex surface.

further comprising providing an Offner null lens configuration to at least partially null the spherical aberration;

further comprising providing a phase correction component for at least partially correcting the wavefront for the at least one of the coma and the higher-order aberration;

further comprising providing an active optical element;

wherein the optical component to be tested is one of a convex and a concave surface of a mirror or a lens;

further comprising focusing a diverging wavefront from the optical component under test prior to at least partially correcting the wavefront;

further comprising at least partially correcting the wavefront for the at least one of the coma and the higher-order aberration;

further comprising providing an Offner null lens configuration to at least partially-null the spherical aberration.

An embodiment of the invention is an apparatus and associated method for testing a phi-polynomial surface with a conventional, commercially available Fizeau or Twyman-Green type interferometer. The apparatus uses several simple (singlet) optical elements in an Offner null configuration in addition to an active optical element (e.g., actuated, deformable membrane) to create an asymmetric reference wavefront that allows for conventional null-based or quasi-null-based interferometry.

The proposed testing apparatus and method provides a way to test a nonsymmetric optical surface such as a phi-polynomial surface. The combination of an Offner null, a tilted mirror, and an active element (e.g., deformable mirror, optical phase modulator, spatial light modulator, etc.) act as a null or quasi-null all-in-one interferometric setup. This solution solves the problem of exceeding the dynamic range of a conventional interferometer when trying to test these types of optical surfaces. Current solutions to this problem include either using a Stylus profilometer or computer generated hologram (CGH).

It is to be understood that both the foregoing general description and the following detailed description are merely exemplary of the embodied invention, and are intended to provide an overview or framework for understanding the nature and character of the invention embodiments as they are claimed. The accompanying drawings are included to provide a further understanding of the invention, and are incorporated in and constitute a part of this specification. The drawings illustrate various embodiments of the invention and together with the description serve to explain the principles and operation of the invention.

DETAILED DESCRIPTION OF EXEMPLARY EMBODIMENTS OF THE INVENTION

Reference will now be made in detail to the present exemplary embodiments of the invention, examples of which are illustrated in the accompanying drawings.

A ϕ-polynomial surface takes the form:

$$z = F(\rho, \phi), \quad (1)$$

where the sag, z, is represented by some function that depends on the radial component, $\rho$, and the azimuthal component, $\phi$. With the sag of the optical surface taking this form, the surface is no longer limited to being rotationally symmetric as is the case when the sag only depends on the radial component, that is, $z = F(\rho)$. Moreover, with this additional degree of freedom the surface can correct for asymmetric aberrations (i.e. coma) within an optical design.

According to an illustrative, non-limiting example for demonstrating the embodied invention, the ϕ-polynomial surface type that is used is a Zernike polynomial surface described by the following equation:

$$z = \frac{c\rho^2}{1 + \sqrt{1 - (1+k)c^2\rho^2}} + \sum_{j=1}^{16} C_j Z_j, \quad (2)$$

where z is the sag of the surface, c is the vertex curvature, k is the conic constant, $\rho$ is the radial component, $Z_j$ is the $j^{th}$ FRINGE Zernike polynomial, and $C_j$ is the coefficient of $Z_j$. Each $Z_j$ is a polynomial in radial coordinates (R and ϕ), where R is a quantity normalized to a radius $R_{norm}$, that is, $R = (\rho/R_{norm})$.

Figure 1:
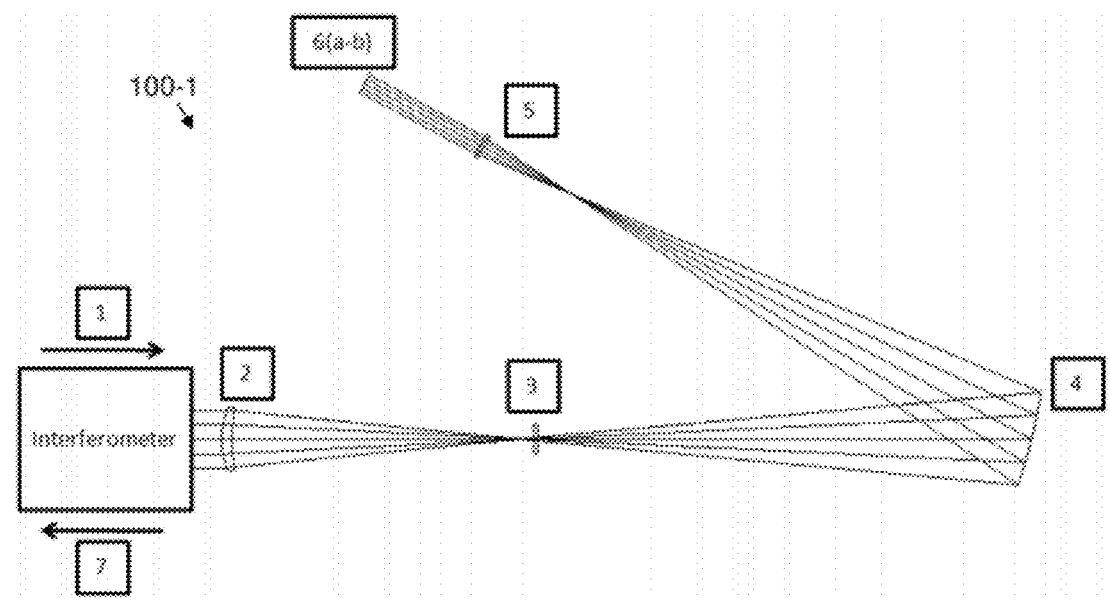
FIG. 1: Optical schematic of optical surface metrology apparatus for testing a concave ϕ-polynomial surface, according to an illustrative embodiment of the invention.

An optical surface metrology apparatus 100-1 that is capable of measuring a phi (ϕ)-polynomial surface with a conventional, commercially available Fizeau or Twyman-Green type based interferometer according to the embodied invention is shown in FIG. 1. The apparatus includes a conventional Offner null lens configuration 2, 3. The surface under test 4 is tilted to null the astigmatic terms present in the surface. The Offner null lens consists of a focusing lens 2 and field lens 3 near the intermediate image. The shape (curvatures) of the focusing lens 2 generates the amount of spherical aberration needed to correct or at least partially correct for the surface under test 4. The field lens 3 provides pupil conjugation so that higher-order aberrations are not introduced into the test wavefront. Relay lens 5 relays the wavefront from surface under test 4 to a deformable mirror 6, which nulls coma and/or higher-order terms present in the wavefront and retro-reflects the wavefront back through the testing configuration so that the system can operate in a double-pass configuration without inversion. This additional degree of freedom enables additional correction of the wavefront to minimize the deviation between the test and reference wavefronts. As in the Offner configuration 2, 3, the pupils are conjugate to one another.

Figure 2:
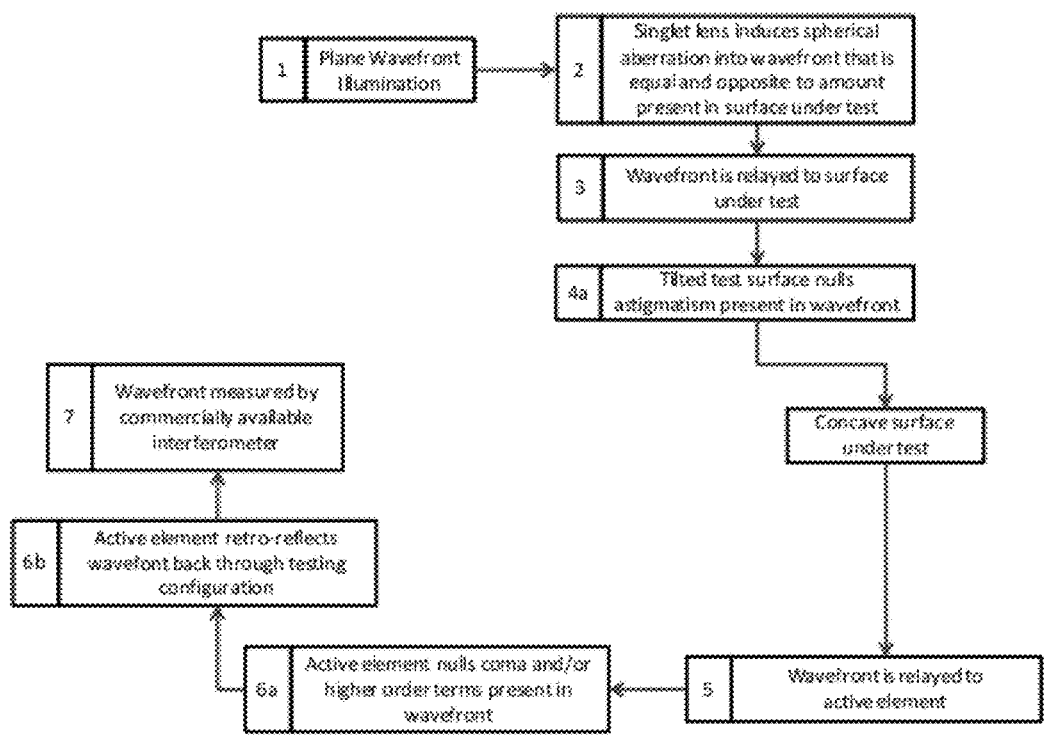
FIG. 2: A flowchart illustrating a testing method for a concave ϕ-polynomial surface, according to an illustrative embodiment of the invention.

FIG. 2 is a flowchart that shows the steps of a testing method for a concave ϕ-polynomial surface in conjunction with the metrology apparatus 100-1, according to an illustrative embodiment of the invention (flow chart reference numbers correspond to numbered elements in FIG. 1). Plane wavefront illumination is provided at 1. At 2, a singlet lens induces spherical aberration into the wavefront that is equal and opposite to the amount present in the surface under test 4, or sufficient to at least partially correct for spherical aberration present in the surface under test so that the difference between the test and reference wavefronts is within the dynamic range of the interferometer. At 3, the wavefront is relayed to the surface under test and again relayed by lens 5 to the active element 6, which at least partially nulls coma and/or higher-order terms present in the wavefront and retro-reflects the wavefront back through the testing configuration where it can be measured by a commercially available interferometer 7.

Figure 3:
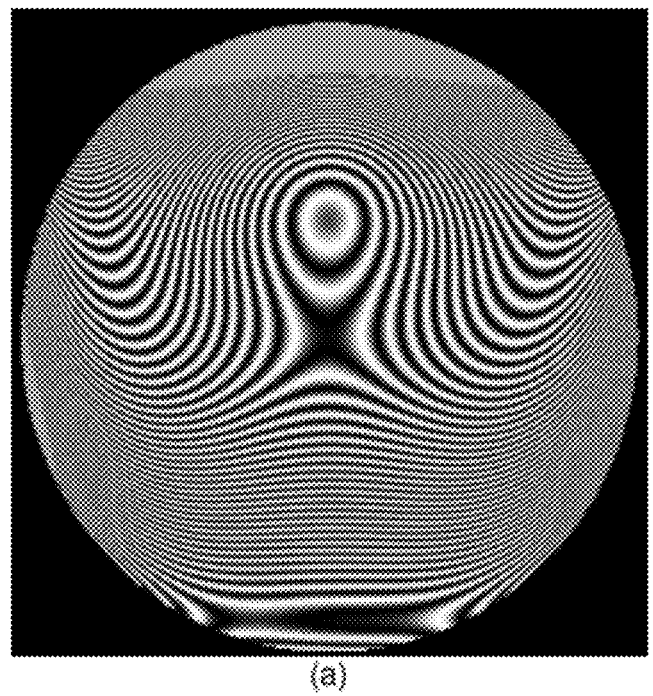
FIG. 3: Simulated interferogram of the wavefront exiting the null optic configuration before (a) and after (b) correction with the deformable mirror of the system illustrated in FIG. 1 (fringes are simulated at 633 nm); according to an illustrative aspect of the invention.
Figure 3:
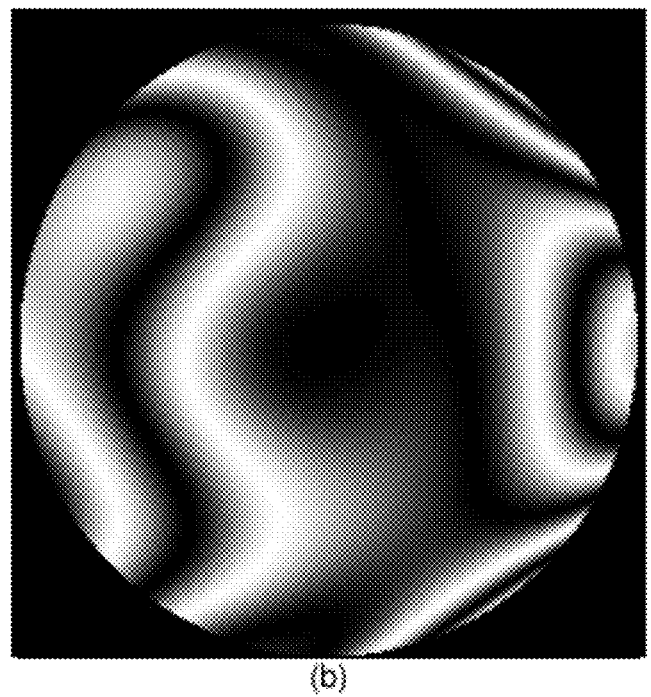

A simulation of the wavefront exiting the system before and after correction by the deformable mirror is shown in FIGS. 3*a*, 3*b*, respectively. As can be seen from the figure, before the system has been corrected by the deformable mirror FIG. 3*a*, there is a 50λ (at 633 nm) P-V deviation of the wavefront from the planar reference wavefront. In this configuration, the fringe density will be too great to measure the surface. However, after correction of the comatic terms with the actuated, membrane mirror FIG. 3*b*, the P-V departure from planar is on the order of 2λ and within the dynamic range of a conventional interferometer.

The correction of comatic terms in the exiting wavefront is limited to the stroke of the active element; therefore, it may be possible that not all the comatic terms present in the Zernike surface can be removed from the exiting wavefront. Thus the active element may act as a quasi-null, where the residual will have to be subtracted within software during post-processing of the results.

Figure 4:
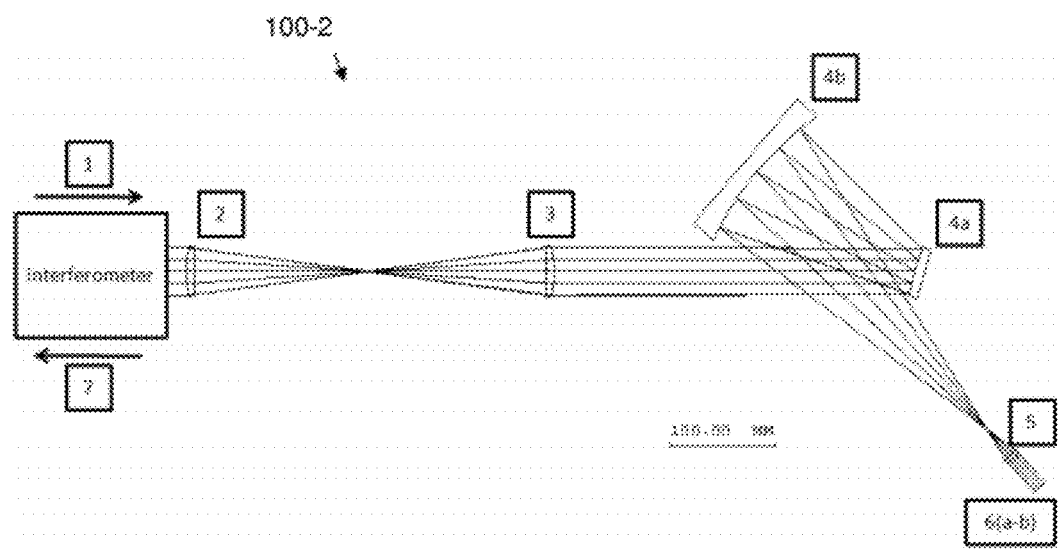
FIG. 4: Optical schematic of optical surface metrology apparatus for testing a convex ϕ-polynomial surface, according to an illustrative embodiment of the invention.

An optical surface metrology apparatus 100-2 that can be used to test a convex ϕ-polynomial surface according to the embodied invention is shown in FIG. 4. The apparatus includes an afocal null lens configuration 2, 3. The convex surface under test 4*a* is tilted to null the astigmatic terms present in the surface under test. The null lens consists of a focusing lens 2 and relay lens 3. The shape (curvatures) of the front lens 2 generates the amount of spherical aberration needed to correct for the surface under test 4*a*, or sufficient to at least partially correct the spherical aberration present in the surface under test so that the difference between the test and reference wavefronts is within the dynamic range of the interferometer. The relay lens 3 provides pupil conjugation so that higher-order aberrations are not introduced into the test wavefront and provides an afocal output. A tilted, concave sphere 4*b* is used to focus diverging light from the surface under test 4*a*. Relay lens 5 relays the wavefront from the concave surface under test 4*b* to an active element 6, which at least partially nulls coma and/or higher-order terms present in wavefront and retro-reflects the wavefront back through the testing configuration so that the system can operate in a double pass configuration without inversion. This additional degree of freedom enables additional correction of the wavefront to minimize the deviation between the test and reference wavefronts. As in the Offner configuration 2, 3, the pupils are conjugate to one another.

Figure 5:
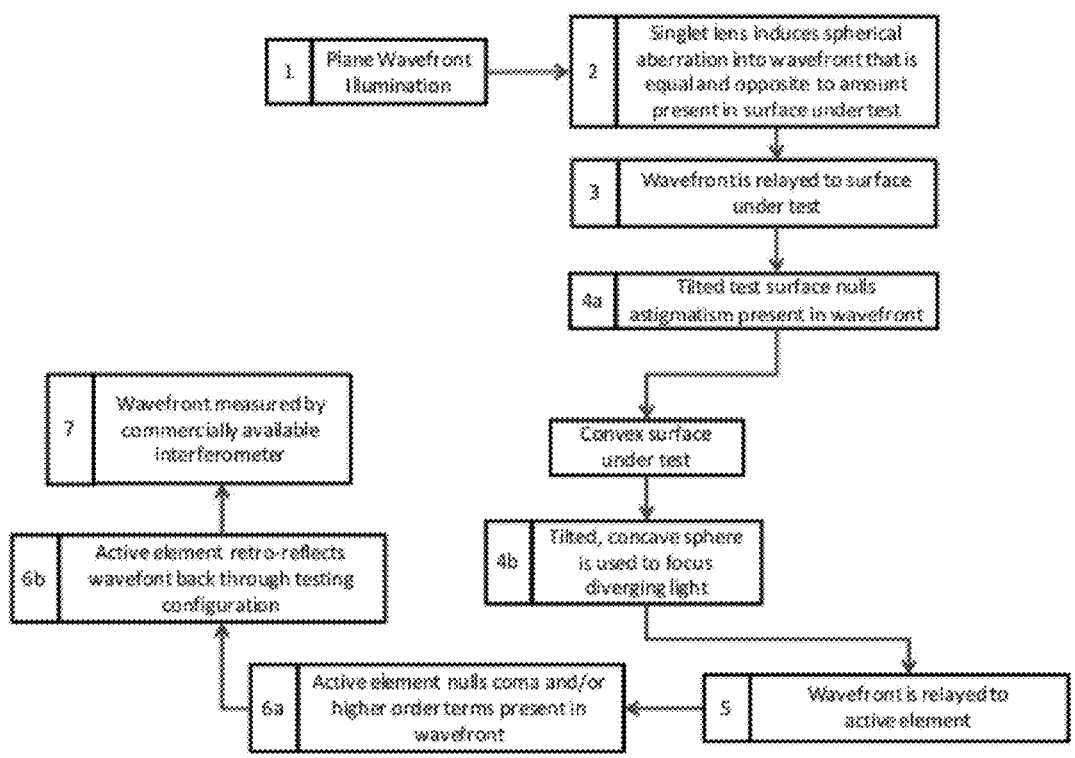
FIG. 5: A flowchart illustrating a testing method for a convex ϕ-polynomial surface, according to an illustrative embodiment of the invention.

FIG. 5 is a flowchart that shows the steps of a testing method for a convex ϕ-polynomial surface in conjunction with the metrology apparatus 100-2, according to an illustrative embodiment of the invention (flow chart reference numbers correspond to numbered elements in FIG. 1). Plane wavefront illumination is provided at 1. At 2, the singlet lens induces spherical aberration into the wavefront that is equal and opposite to the amount present in the surface under test 4*a*, or sufficient to at least partially correct the spherical aberration present in the surface under test. At 3, the wavefront is relayed to the surface under test which is tilted to null astigmatism present in wavefront. The diverging light is further reflected from a tilted, concave sphere that is used to focus the diverging light, and then relayed by lens 5 to the active element 6, which at least partially nulls coma and/or higher-order terms present in the wavefront and retro-reflects the wave font back through the testing configuration where it can be measured by a commercially available interferometer 7.

The use of the terms "a" and "an" and "the" and similar references in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening.

The recitation of ranges of values herein are merely intended to serve as a shorthand method of referring individually to each separate value falling within the range, unless otherwise indicated herein, and each separate value is incorporated into the specification as if it were individually recited herein.

All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not impose a limitation on the scope of the invention unless otherwise claimed.

No language in the specification should be construed as indicating any non-claimed element as essential to the practice of the invention.

It will be apparent to those skilled in the art that various modifications and variations can be made to the present invention without departing from the spirit and scope of the invention. There is no intention to limit the invention to the specific form or forms disclosed, but on the contrary, the intention is to cover all modifications, alternative constructions, and equivalents falling within the spirit and scope of the invention, as defined in the appended claims. Thus, it is intended that the present invention cover the modifications and variations of this invention provided they come within the scope of the appended claims and their equivalents.

We claim:
1. An optical surface metrology apparatus, comprising:
a light source adapted to output a plane wavefront in a first propagation direction;
a plurality optical components disposed in an Offner configuration, optically coupled to the light source;

an optical component under test disposed in a first tilted orientation and optically coupled to the plurality optical components, wherein the optical component under test is characterized by a phi (φ)-polynomial surface; and an optical phase controller optically coupled to the optical relay component;

an optical component disposed in the Offner configuration is configured to collimate, converge, or diverge a diverging wavefront propagating from the optical component under test.

2. The optical surface metrology apparatus of claim 1, wherein the plurality of optical components disposed in an Offner configuration is an Offner null lens consisting of a spherical aberration component and a relay component.

3. The optical surface metrology apparatus of claim 1, wherein the optical component under test has one of a concave and a convex surface.

4. The optical surface metrology apparatus of claim 3, wherein the optical component under test is one of a concave surface and a convex surface of a mirror or a lens.

5. The optical surface metrology apparatus of claim 1, wherein the optical phase controller is a deformable mirror.

6. The optical surface metrology apparatus of claim 1, wherein the optical phase controller is a dynamically addressable wavefront generator.

7. The optical surface metrology apparatus of claim 1, wherein the optical phase controller is a dynamically addressable asymmetric wavefront generator.

8. The optical surface metrology apparatus of claim 4, further comprising an optical component disposed in a second tilted orientation, wherein the optical component is characterized by a capability to converge a diverging wavefront propagating from the optical component under test.

9. The optical surface metrology apparatus of claim 1, further comprising an interferometer capable of performing conventional null-based or quasi-null-based interferometry, disposed on an output side of the Offner configuration and optically coupled to an output of the optical phase controller.

10. The optical surface metrology apparatus of claim 9, wherein the output of the optical phase controller is an asymmetric reference wavefront.

11. The optical surface metrology apparatus of claim 9, wherein the interferometer is a Fizeau-type interferometer.

12. The optical surface metrology apparatus of claim 9, wherein the interferometer is a Twyman Green interferometer.

13. The optical surface metrology apparatus of claim 1, wherein the optical component under test is disposed in a first tilted orientation sufficient to null astigmatism.

14. The optical surface metrology apparatus of claim 1, wherein the optical phase controller is adapted to at least partially null at least one of coma and any higher-order φ-polynomial terms.

15. A method for optical surface metrology of a φ-polynomial surface, comprising:

a) providing an optical component to be tested, wherein the optical component to be tested has a φ-polynomial surface and is characterized by an amount of at least one of spherical aberration, coma, astigmatism, and higher-order aberrations;

b) propagating a plane wavefront towards the φ-polynomial surface of the optical component to be tested;

c) providing an optical component that induces spherical aberration to the plane wavefront in an amount sufficient to at least partially null the spherical aberration in the optical component to be tested;

d) tilting the optical component to be tested to null the astigmatism therein, and generating a wavefront having at least one of coma and a higher-order aberration;

e) at least partially correcting the wavefront for the at least one of the coma and the higher-order aberration;

f) propagating the at least partially-corrected wavefront back to the optical component to be tested and to the optical component that induced the spherical aberration to the plane wavefront, referred to as the test wavefront;

g) collimating, converging, or diverging a diverging wave front propagating from the optical component under test using an optical component disposed in the Offner configuration.

16. The method of claim 15, further comprising comparing the test wavefront to a reference wavefront.

17. The method of claim 15, further comprising providing a Fizeau-type interferometer to compare the test wavefront to the reference wavefront.

18. The method of claim 15, further comprising providing a Twyman-Green interferometer to compare the test wavefront to the reference wavefront.

19. The method of claim 15, wherein the optical component to be tested has one of a concave and a convex surface.

20. The method of claim 19, further comprising providing an Offner null lens configuration to at least partially null the spherical aberration.

21. The method of claim 20, further comprising providing a phase correction component for at least partially correcting the wavefront for the at least one of the coma and the higher-order aberration.

22. The method of claim 21, further comprising providing an active optical element.

23. The method of claim 15, wherein the optical component to be tested is one of a convex and a concave surface of a mirror or a lens.

24. The method of claim 23, further comprising focusing a diverging wavefront from the optical component under test prior to at least partially correcting the wavefront.

25. The method of claim 24, further comprising at least partially correcting the wavefront for the at least one of the coma and the higher-order aberration.

26. The method of claim 23, further comprising providing an Offner null lens configuration to at least partially-null the spherical aberration.

* * * * *